(12) United States Patent
Lamstein

(10) Patent No.: US 8,176,877 B2
(45) Date of Patent: May 15, 2012

(54) COLLAPSIBLE PET ENCLOSURE

(75) Inventor: Aaron Lamstein, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 1576 days.

(21) Appl. No.: 11/024,398

(22) Filed: Dec. 23, 2004

(65) Prior Publication Data

US 2006/0137622 A1    Jun. 29, 2006

(51) Int. Cl.
*A01K 1/03* (2006.01)

(52) U.S. Cl. .................................................. 119/498

(58) Field of Classification Search .............. 119/452, 119/461, 474, 491, 498, 504, 513, 161, 168, 119/174; 229/114–116
See application file for complete search history.

(56) References Cited

U.S. PATENT DOCUMENTS

| | | | |
|---|---|---|---|
| 204,441 A | 6/1878 | Marshall | |
| 443,397 A * | 12/1890 | Mack | 229/115 |
| 1,483,443 A | 2/1924 | Hogan | |
| 1,597,757 A | 8/1926 | Berger | |
| 1,673,176 A | 6/1928 | Benner | |
| 2,935,238 A * | 5/1960 | Koehler | 229/116 |
| 2,965,376 A | 12/1960 | Kessler | |
| 3,359,657 A | 12/1967 | Hedberg | |
| 3,485,202 A | 12/1969 | Platt | |
| 3,611,617 A | 10/1971 | Foster | |
| 3,666,607 A | 5/1972 | Weissman | |
| 3,759,277 A | 9/1973 | Glade | |
| 3,861,975 A * | 1/1975 | Hauslein | 156/217 |
| 4,064,662 A | 12/1977 | O'Toole | |
| 4,133,137 A * | 1/1979 | van Adelsberg | 43/114 |
| 4,192,423 A | 3/1980 | Rekow | |
| 4,269,348 A * | 5/1981 | Young | 229/115 |
| 4,426,801 A | 1/1984 | Gates | |
| 4,462,145 A * | 7/1984 | Schulze | 29/428 |
| 4,639,101 A * | 1/1987 | Stefancin, Jr. | 359/855 |
| 4,798,747 A | 1/1989 | Laramee | |
| D310,740 S * | 9/1990 | Mannschreck | D30/161 |
| 4,986,464 A | 1/1991 | Leigh | |
| 5,014,455 A | 5/1991 | Desaderata | |
| 5,128,850 A * | 7/1992 | Juodvalkis | 362/352 |
| 5,225,254 A | 7/1993 | Foulke | |
| 5,628,396 A * | 5/1997 | Weiner | 206/216 |
| 5,839,590 A * | 11/1998 | Weiner | 206/577 |
| 5,842,630 A * | 12/1998 | Remer | 229/116 |
| 5,842,634 A | 12/1998 | Kieler | |
| 6,119,621 A | 9/2000 | Johnson | |
| 6,325,086 B1 | 12/2001 | Shinner | |
| 6,467,029 B1 * | 10/2002 | Kitayama | 711/135 |
| 6,487,990 B1 * | 12/2002 | McNew | 119/168 |
| 6,502,744 B1 | 1/2003 | Lorusso | |
| 6,698,382 B1 * | 3/2004 | Blaszak et al. | 119/168 |
| 6,705,514 B2 | 3/2004 | Pellati | |
| 6,837,334 B1 * | 1/2005 | Le Prevost | 181/177 |
| 7,245,729 B2 * | 7/2007 | Bank et al. | 381/152 |

* cited by examiner

*Primary Examiner* — Richard Price, Jr.
(74) *Attorney, Agent, or Firm* — Bay Area Technology Law Group PC

(57) ABSTRACT

A collapsible pet enclosure in the form of a planar sheet material configured in the shape of a trapezoid. The planar sheet material is foldable along creases to create three subparts, each subpart being in the shape of a triangle. At least one of the triangular subparts is provided with an opening configured therein.

2 Claims, 1 Drawing Sheet

COLLAPSIBLE PET ENCLOSURE

TECHNICAL FIELD

The present invention involves a collapsible pet enclosure which is capable of being shipped and stored in a substantially two dimensional configuration but which is capable of being erected on site to create a three dimensional enclosure suitable as a pet sanctuary.

BACKGROUND OF THE INVENTION

The nationwide pet market is experiencing rapid growth as more and more families recognize the benefits of pet ownership. A pet owner's devotion to one's pet often time rivals that which one would ordinarily attribute to human parenting.

Veterinarians and other professionals devoted to the well-being of domestic pets recommend that certain pets, such as domestic cats, benefit by providing an enclosure as a sanctuary that the cat can employ whenever the need for such a sanctuary presents itself. Regardless of how outgoing, affectionate and socialized a domestic cat happens to be, the benefits derived from a separate sanctuary that the cat believes is off limits to its human companionship can be of great psychological effect.

Although pet enclosures, by and large, are somewhat inexpensive to fabricate, an inordinate fraction of the enclosure's retail price is attributable to shipping costs. Most such products are produced offshore where labor costs are relatively low. However, because enclosures tend to be three dimensional, objects of sufficient volume to provide the sought after sanctuary effect take up large volumes of a shipping container thus adding excessively to the costs of such products.

It is thus an object of the present invention to provide a suitable collapsible pet enclosure which can be shipped as a substantially two dimensional planar sheet material but which can be constructed on site creating the sought after three dimensional enclosure.

These and further objects will be more readily appreciated considering the following disclosure and appended claims.

SUMMARY OF THE INVENTION

The present invention is directed to a collapsible pet enclosure comprising a substantially planar sheet material configured in the shape of a trapezoid. The planar sheet material being foldably creased to create three subparts, each subpart being in the shape of a triangle and at least one of the subparts having an opening configured therein.

DETAILED DESCRIPTION OF THE INVENTION

Figure 1:
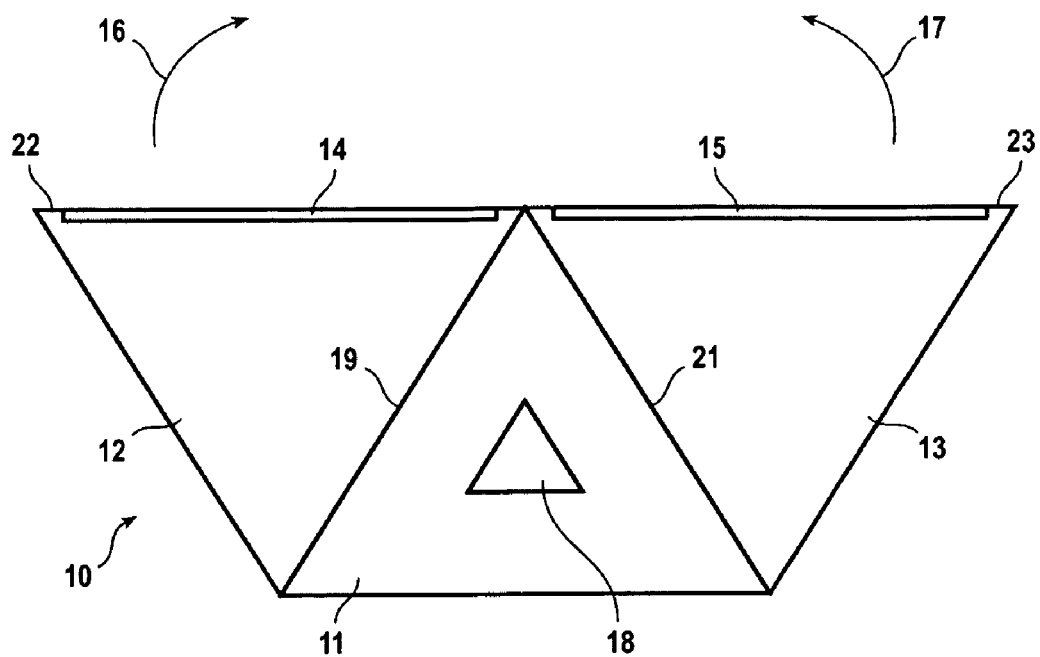
FIG. 1 is a top plan view of the collapsible pet enclosure as seen as a planar sheet.

Turning to FIG. 1, collapsible pet enclosure 10 is shown as a substantially planar sheet configured in the shape of a trapezoid. The planar sheet is shown as being foldably creased along crease line 19 and 21 creating subparts 11, 12 and 13 in the shape of triangles. As noted in reference to FIG. 1, at least one of the triangles 11 is provided with opening 18 which will be sized to suitably allow a domestic cat to enter and leave the pet enclosure.

As noted above, collapsible pet enclosure 10, comprising triangular subparts 11, 12 and 13 are foldable with respect to one another. Specifically, centrally located triangular subpart 11 is provided with a first edge 19 contiguous with first adjacent triangular subpart 12 and second edge 21 contiguous with second adjacent triangular subpart 13. As noted further in reference to FIG. 1, triangular subpart 12 is provided with free edge 22 while triangular subpart 13 is provided with free edge 23.

Figure 2:
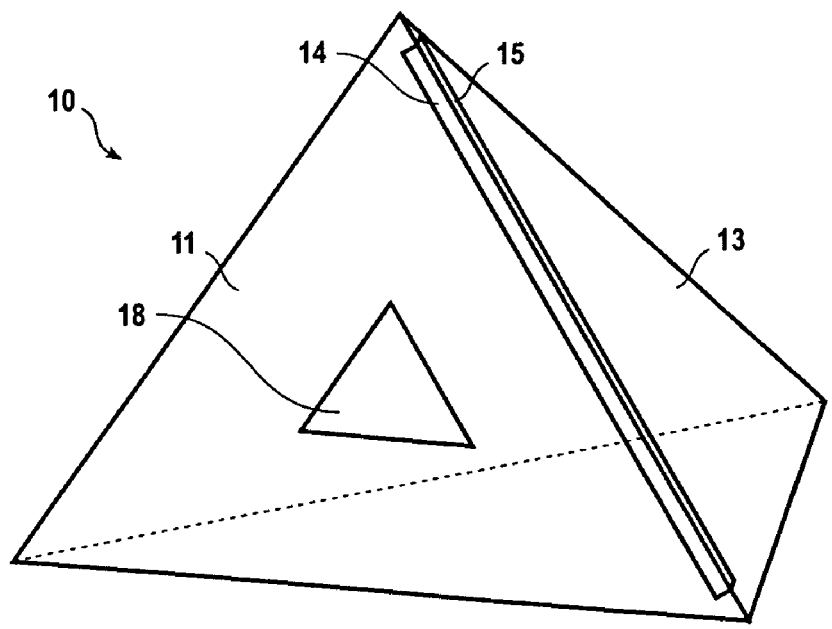
FIG. 2 is a three dimensional pet enclosure erected from the planar sheet of FIG. 1.

In order to achieve the results sought after herein, collapsible pet enclosure 10 is provided with complimentary closure elements 14 and 15 configured along free edges 22 and 23 of triangular subparts 12 and 13, respectively. Complimentary closure elements 14 and 15 are caused to releasably engage with one another to maintain said enclosure in a three-dimensional configuration as depicted in FIG. 2. Complimentary closure elements 14 and 15 can be any closure elements suitable for this purpose, the nature of which would be well appreciated by anyone skilled in this art. For example, complimentary closure elements 14 and 15 could be, for example, zippered elements, hook and loop (Velcro®) fasteners, snaps or releasable tape. The attributes of complimentary closure elements 14 and 15 must simply be that the closure elements are releasable so that collapsible pet enclosure 10 can be collapsed for convenient, low volume shipping and storage but capable of maintaining the three dimensional configuration shown in FIG. 2 notwithstanding the abuse anticipated by an active, healthy pet.

When the present invention is to be used by a domestic cat, it is further contemplated that at least one surface of the planar sheet material be roughened. This would enable a feline to use collapsible pet enclosure 10 as a scratching surface. Such a roughened surface could be provided simply by carpeting one or more outer faces of any or all of triangular subparts 11, 12 and 13.

The invention claimed is:

1. A collapsible pet enclosure consisting essentially of a substantially planar sheet configured in the shape of a trapezoid, said planar sheet being foldably creased to create three subparts, each subpart being in the shape of a triangle and at least one of said subparts having an opening configured therein sized to suitably allow a domestic cat to enter and leave the pet enclosure and wherein at least one surface of said planar sheet material is a roughened surface.

2. The collapsible pet enclosure of claim 1 wherein said roughened surface comprises a carpeted surface.

* * * * *